(12) United States Patent
Lyon et al.

(10) Patent No.: US 9,008,639 B2
(45) Date of Patent: Apr. 14, 2015

(54) CONTROLLING AUDIO OF A DEVICE

(75) Inventors: James M. Lyon, Redmond, WA (US); James Kai Yu Lau, Bellevue, WA (US); Raman Kumar Sarin, Redmond, WA (US); Jae Pum Park, Bellevue, WA (US); Monica Estela Gonzalez Veron, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 171 days.

(21) Appl. No.: 13/046,680

(22) Filed: Mar. 11, 2011

(65) Prior Publication Data
US 2012/0231838 A1 Sep. 13, 2012

(51) Int. Cl.
*H04M 3/00* (2006.01)
*G11B 19/02* (2006.01)
*H04M 1/247* (2006.01)
*H04M 1/725* (2006.01)

(52) U.S. Cl.
CPC ............... *G11B 19/02* (2013.01); *H04M 1/247* (2013.01); *H04M 1/72522* (2013.01); *H04M 2250/12* (2013.01)

(58) Field of Classification Search
CPC .................. H04W 8/245; H04M 1/72525
USPC ................... 455/418, 567; 701/400
See application file for complete search history.

(56) References Cited

U.S. PATENT DOCUMENTS

| 5,583,776 | A | * | 12/1996 | Levi et al. ..................... 701/400 |
| 7,532,879 | B1 | | 5/2009 | Fujisaki |
| 7,626,504 | B2 | | 12/2009 | Chang |
| 2001/0053709 | A1 | | 12/2001 | Terasaka |
| 2003/0032457 | A1 | | 2/2003 | Leung |
| 2006/0063563 | A1 | | 3/2006 | Kaufman |
| 2006/0195270 | A1 | * | 8/2006 | Charlton ........................ 702/22 |
| 2008/0165022 | A1 | * | 7/2008 | Herz et al. .................... 340/669 |

FOREIGN PATENT DOCUMENTS

WO WO 2004082248 A1 * 9/2004

OTHER PUBLICATIONS

"How might we help people auto silent their mobile phone by using the position on GPS?" <http://reportdd.com/information-technology/how-might-we-help-people-auto-silent-their-mobile-phone-by-using-the-position-on-gps.html>, 3 pages, Published Date: Jul. 12, 2010.

"Change Your Phone Settings Automatically Using Android App," <http://theindustries.net/blog/locale-android/>, 3 pages, Published Date: Nov. 24, 2010.

Wikipedia, "Pearson product-moment correlation coefficient," <http://en.wikipedia.org/wiki/Pearson_product-moment_correlation_coefficient>, 10 pages, visited Feb. 7, 2011.

HTC, "HTC 7 Pro Windows Phone 7," http://www.htc.com/www/product/7pro/overview.html, 3 pages, visited Feb. 9, 2011.

* cited by examiner

*Primary Examiner* — Patrick Edouard
*Assistant Examiner* — Chuck Huynh
(74) *Attorney, Agent, or Firm* — Brian Haslam; Mike Allen; Micky Minhas

(57) ABSTRACT

Techniques and tools are described for controlling an audio signal of a mobile device. For example, information indicative of acceleration of the mobile device can be received and correlation between the information indicative of acceleration and exemplar whack event data can be determined. An audio signal of the mobile device can be controlled based on the correlation.

20 Claims, 9 Drawing Sheets

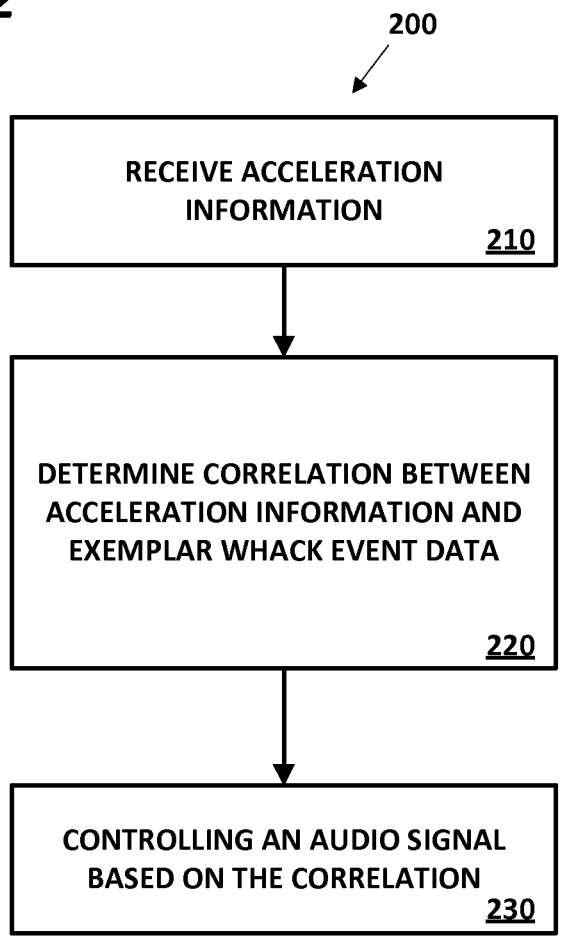

CONTROLLING AUDIO OF A DEVICE

BACKGROUND

Mobile devices have become ubiquitous in today's world. Such devices can offer a wide variety of functionality in a single device, such as that traditionally provided by separate mobile phone and computing devices.

As such devices grow in capability and complexity, it can become increasingly more difficult to quickly invoke particular functionality. Further, it can be difficult to access traditional interfaces to the device when the device is carried in a pocket or bag.

At the same time, mobile devices are becoming increasingly more audible. A variety of audio ring tones, alerts, music, and the like are commonplace for such devices.

However, there are times when silence is desired. For example, during a meeting or other event, it may be inappropriate to allow the device to emit audio output.

Traditionally, a user can set the device to a silent or vibrate mode. While such an approach is useful, there is still room for improvement.

SUMMARY

In summary, the Detailed Description presents various tools and techniques for controlling an audio signal of a mobile device by detecting a whack.

According to one implementation of the technologies described herein, a mobile device can produce and audio signal. For example, a mobile device can ring to indicate an incoming call. Acceleration information of the mobile device can be received while the audio signal is being produced. For example, periodic measurements of acceleration can be received from an accelerometer of the mobile device. A correlation between the acceleration information and exemplar whack event data can be determined. Based on the determined correlation, the audio signal of the mobile device can be controlled. For example, the ringing of the mobile device can be controlled when a correlation is sufficient to indicate a whack is detected.

In another implementation, a mobile device can detect multiple whacking events within a threshold time interval. For example, a user of the mobile device can whack the mobile device twice quickly and the mobile device detects the whacks. An audio signal of the mobile device can be controlled based on the determination that multiple whacking events were detected within the time interval.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the technologies will become more apparent from the following Detailed Description, which proceeds with reference to the accompanying figures.

BRIEF DESCRIPTION OF THE DRAWINGS

FIG. 2 is a flowchart of an exemplary method of implementing the whack based audio control technologies described herein.

DETAILED DESCRIPTION

Example 1

Exemplary Overview

There are a variety of circumstances under which it may be desirable to quickly control a device without having to interact with a traditional user interface. For example, often mobile device users forget to set their mobile devices in a silent or vibrate mode and the device rings or makes sounds at an inopportune moment. The techniques described herein can be used for controlling an audio signal of the mobile device in response to a whacking of the mobile device.

Example 2

Exemplary System Employing a Combination of the Technologies

Figure 1:
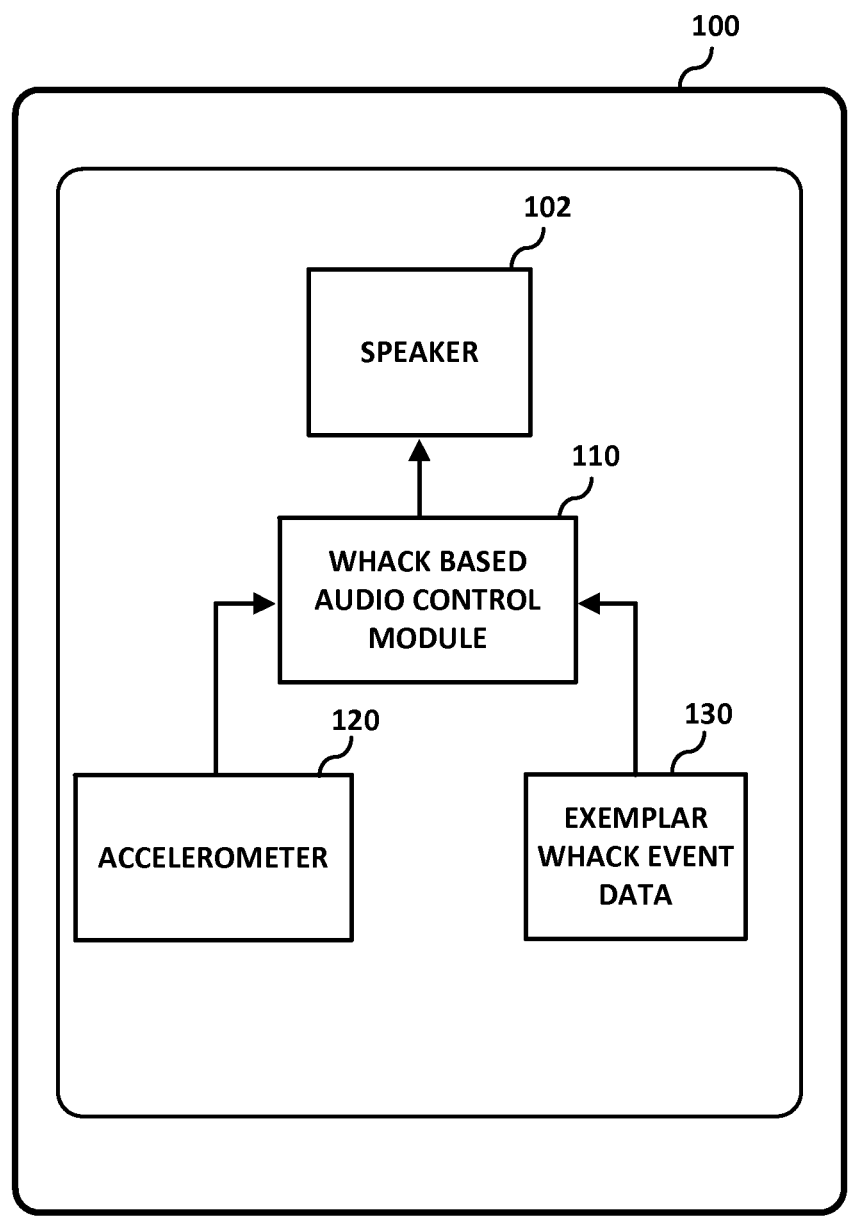
FIG. 1 is a block diagram of an exemplary system implementing the whack based audio control technologies described herein.

FIG. 1 is a block diagram of an exemplary mobile device 100 that can produce an audio signal that can be controlled. In the example, the mobile device 100 can produce an audio signal using speaker 102. The audio signal can be controlled when a user whacks the mobile device 100 and the whacking event is detected. For example, while the audio signal is being produced, the whack based audio control module 110 of the mobile device 100 can receive acceleration data from accelerometer 120. The acceleration data indicates acceleration of the mobile device 100 detected by the accelerometer 120. The mobile device 100 can include exemplar whack event data 130 that indicates exemplar acceleration during a whacking event. The whack based audio control module 110 can receive exemplar event data 130 to determine a correlation between the acceleration data and exemplar event data 130 to detect a whacking event. When a whacking event is detected and responsive thereto, the audio signal is controlled.

The connections shown in FIG. 1 do not necessarily indicate direct connections and can be more complex including intermediate connections. In practice, the mobile device 100 can be less or more complicated (e.g., with additional functionality than that shown).

Example 3

Exemplary Method of Employing a Combination of the Technologies

FIG. 2 is a flowchart of an exemplary method 200 of controlling an audio signal of a mobile device and can be implemented, for example, in a system such as that shown in FIG. 1.

At 210, information indicative of acceleration of the mobile device is received. For example, as the mobile device produces an audio signal, an accelerometer can periodically measure the current acceleration of a mobile device over a period of time, and the acceleration information is received from the accelerometer. Information indicative of acceleration of the mobile device can be generated by the accelerometer in response to acceleration of the mobile device. For example, when a user whacks the mobile device, the mobile device accelerates in response to the user whack.

At 220, a correlation between exemplar whack event data and the information indicative of acceleration of the mobile device is determined.

At 230, an audio signal is controlled based on the correlation.

Example 4

Exemplary Information Indicative of Acceleration

In any of the examples herein, the information indicative of acceleration (e.g., acceleration data) can include measurements of acceleration. For example, the information indicative of acceleration can be a plurality of magnitudes of acceleration reflecting measurements of acceleration during the movement of the mobile device. In practice, the magnitudes can take the form of scalar values (e.g., in g's, multiples of g's, fractions of g's, or the like). Typically, the data is collected on a real-time or near real-time basis so it can be determined whether a whack is currently taking place or has happened in the immediate past.

The measurements of acceleration can be taken and output by an accelerometer coupled to a mobile device. A service on the mobile device can provide the data upon request so that the whack based audio control technologies need not implement the details of interfacing with the accelerometer.

The magnitudes of acceleration can be from a single axis of measurement or multiple axes of measurement. Multiple axes can take the form of an x, y, z configuration.

Information indicative of acceleration can be provided in the form of data samples that indicate measurements of acceleration sampled periodically over a span of time (e.g., n measurements per second). In one periodic sampling implementation, 50 measurements per second are taken; however, the technologies can work with a different sampling rate.

Example 5

Exemplary Exemplar Whack Event Data

In any of the examples herein, exemplar whack event data can be data corresponding to an exemplar whack (e.g., data representing a typical whack by a typical user).

The exemplar whack event data can be acceleration data similar to data that would be produced by an accelerometer during a whack event that can be a typical user's whack of a mobile device. For example, the exemplar event data can be a plurality of magnitudes of acceleration that change values exemplifying the acceleration over time of a mobile device that has been whacked by a user. The exemplar event data can exemplify the acceleration over time of a mobile device in various orientations, positions, or under conditions when whacked by a typical user. For example, the exemplar whack event data can be of a pattern similar to a pattern of acceleration data of a mobile device whacked or impacted by a user in a shirt pocket, a pants pocket, a bag, a purse, flat, on edge, or on a table. The magnitudes of acceleration can correspond to a single axis or multiple axes. In practice, exemplar whack data can be supplied with a mobile device as part of an original configuration. Adjustment (e.g., by the user) can be supported. For example, a high, medium, and low setting can be supported for sensitivity, which may adjust the exemplar whack event data or the threshold when comparing to the exemplar whack event data.

The exemplar whack event data can be implemented as a canonical pattern of data in the form of an array of acceleration magnitudes. The exemplar whack event data can also be stored, predetermined, or previously entered into a mobile device.

If desired, a training mode can be provided by which a user whacks the device to provide exemplary whack data.

Example 6

Exemplary Correlation Determination

In any of the examples herein, a correlation can be determined between exemplar whack event data and information indicative of acceleration. Correlation can be indicated by sufficient correlation (e.g., sufficient match) between the exemplar whack event data and information indicative of acceleration collected from a mobile device. A correlation can be calculated using a function or statistical technique. For example, a distance function can indicate how different (or how similar) the exemplary whack data is to the acceleration information.

In practice, a comparison between the exemplar whack data and collected acceleration information can be done to generate one or more values indicative of a degree to which there is sufficient correlation. A decision regarding whether there is sufficient correlation can be made based on whether such values meet one or more thresholds.

Because acceleration can be in either of two directions (e.g., depending on orientation of the device, etc.), an absolute value threshold can be used. Alternatively, the correlation can be positive or negative correlation, and sufficient correlation can be found if the value exceeds a positive threshold or falls below a negative threshold (e.g., the same threshold magnitude).

If correlation is determined, a whacking event can be detected.

The threshold value(s) can be set either higher or lower to reduce or increase the sensitivity of the mobile device to detect whacking events by a user.

Additionally, other sensor input can be used to determine that a whacking event has been detected. For example, data from a gyroscope can be used or considered in addition to accelerometer data in determining a correlation and whether a whacking event has been detected.

Example 7

Exemplary Correlation Coefficient

Correlation can be determined by calculating a correlation coefficient based on information indicative of acceleration and exemplar whack event data. An exemplary correlation coefficient is a Pearson's r coefficient (e.g., that varies between −1 and 1). The information indicative of acceleration and exemplar whack event data can be used as input data into a Pearson's r coefficient calculation. The resulting Pearson's r coefficient can indicate by a value the correlation between the information indicative of acceleration and the exemplar whack event data.

Alternatively, a correlation coefficient can be the absolute value or square of a Pearson's r coefficient. Other statistical techniques or functions can be used to find a correlation coefficient between the information indicative of acceleration and the exemplar whack event data.

Example 8

Exemplary Sufficient Correlation for Correlation Coefficient

In any of the examples herein, determining whether a correlation coefficient indicates correlation between acceleration data and exemplar whack event data (e.g., whether a whack event has occurred).

In one implementation, if the correlation coefficient is positive and meets a threshold value, then the correlation can be sufficient to indicate a whacking event is detected. A correlation below the threshold can indicate that the correlation is not sufficient enough to indicate that a whacking event has been detected. Also, if the correlation coefficient is negative and meets (e.g., is below) a threshold value, then the correlation can be sufficient to indicate a whacking event. For example, in the case that a Pearson's r coefficient is used, which can be between −1 and 1, a threshold value could be set at a cutoff for a correlation coefficient that is positive; another threshold value can be set at a cutoff (e.g., a negative inverse of the first cutoff) for a correlation coefficient that is negative. In one embodiment, cutoffs of 0.75 and −0.75 can be used, but other values can be used with the technologies. In some embodiments more than one threshold value can be set.

Example 9

Exemplary Initiation of Collection of Acceleration Data

In any of the examples herein, collection of acceleration data can be initiated in response to a state change of the device. In one example, the collection of acceleration data can be initiated by the production of an audio signal by the mobile device. For example, when the mobile device rings to indicate an incoming call the collection of acceleration data can be initiated and acceleration data can be collected. In other examples, collection of acceleration data can be initiated by a user, a turning on of the mobile device, a state change of the mobile device software, or by other triggers. After detection of the whack or when audio stops (e.g., when not ringing), data need not continue to be collected.

The accelerometer can be turned off when not collecting data (e.g., responsive to determining data is no longer being collected by any applications). Such an approach can save power consumption by the mobile device.

Example 10

Exemplary Audio Signal

In any of the examples herein, an audio signal from a device can be a sound or signal to generate a sound. For example, a sound produced by a speaker or output to be played on speaker. A speaker can be an apparatus that can produce an audio signal. For example, the audio signal can be a ringing, a ringtone, user-initiated audio, a tone, a played recording, an alarm, or the like. The audio signal can be in response to or indicate an incoming call, a message, an update, a reminder for a meeting or event, the playing of music or recording, or the like.

Example 11

Exemplary User-Initiated Audio

In any of the examples herein, user-initiated audio can be that audio initiated by a user, such as playing back music or some other audio recording. Common implementations use MP3s or other audio formats in digital music player functionality.

Example 12

Exemplary Controlling of an Audio Signal

In any of the examples herein, controlling an audio signal can be silencing, playing, or changing an audio signal. In one embodiment, the controlling of an audio signal of the mobile device can trigger other functionality or change a mode of the device. For example, when an incoming call ring has been controlled by a whack, the detection of the whack can also cause the mobile device to ignore the call. Also, for example a controlling of an audio signal can turn a ringer to be on or off.

Controlling can include pausing an audio signal, playing back an audio signal, or the like.

Example 13

Exemplary Silencing

In any of the examples herein, silencing the audio signal can be ending, muting, or pausing the audio signal. For example, a ringtone produced by a speaker of a mobile phone signaling an incoming call can be ended. Also for example, a user can play audio on a mobile device and the audio can be paused or silenced using the technologies described.

In practice, silencing can be achieved via interaction with a sound service on the mobile device.

Example 14

Exemplary Multiple Whacks

In any of the examples herein, multiple whacks of a mobile device can be detected (e.g., within a time interval corresponding to a short period of time) and controlling of an audio signal takes place responsive to detecting such multiple whacks. In one embodiment, a current whack by a user can be detected, and the detection can be recorded as occurring at a current time. Then, a determination can be made if an incidence of a previous whack was detected within a time interval (e.g., a threshold period of time) before the recorded time of the detected current whack.

Alternatively, the time interval between the time of a current whack (e.g., the time being implied because it is current) and a previously recorded whack time (e.g., of a prior whack) can be compared to a predetermined time interval. If the time between the time of a current whack and a previously recorded whack time is within the predetermined time interval then multiple whacks have been detected within the predetermined time interval.

The time interval can be a predetermined duration (e.g., a second). The time interval can be set longer or shorter to increase or decrease the sensitivity of the mobile device to controlling an audio signal based on multiple whacks within the time duration.

Detecting multiple whacks within a time interval can be beneficial. For example, controlling an audio signal a device based on detecting repeated whacks within a time duration can reduce the amount of times a mobile device is controlled based on an unintentional movement (e.g., interpreted as a whack) by a user.

Example 15

Exemplary Acceleration Data Received Before Audio Signal

In any of the examples herein, acceleration data can be collected before a mobile device begins to produce and audio signal. For, example acceleration data can be collected before a mobile device begins to sound an alarm.

The acceleration data collected before a mobile device begins to produce an audio signal can be used in evaluating a correlation between acceleration data collected after the mobile device begins to produce and audio signal and exemplar whack event data. In one example, if acceleration information collected before a mobile device begins signaling indicates that the mobile device is accelerating or is being whacked, the determination of a correlation can be adjusted. For example, the exemplar whack event data can be selected such that it is exemplary of a mobile device in motion, or under other circumstances. For example, mobile device circumstances can be that the mobile device is stationary, moving with corresponding acceleration, or the like.

In another example, a threshold value for determining the sufficiency of a correlation for detecting a whack can be set based on the acceleration information collected before an audio signal is produced. For example, the threshold value can be set higher or lower than a default threshold value. In another example, the acceleration information can be used to filter out noise from acceleration data collected after a mobile device begins to produce and audio signal.

Example 16

Exemplary Feedback for Mode Change

In any of the examples herein, a mobile device can provide feedback that the mobile device has changed modes. For example the mobile device can vibrate one or more times to indicate that the mobile device has entered into a silent mode in response to an audio signal being controlled. In other examples, a mobile device could produce other feedback such as visual flashing or the like.

Example 17

Exemplary Vendor Configuration

In any of the examples herein, a mobile device can be configured by a vendor to control an audio signal based on a whacking of the mobile device. The vendor can configure the exemplar whack event data, threshold values, correlation techniques, and other configurables.

Such an arrangement can be beneficial to tune parameters based on the device. For example, a larger device may have different thresholds than a smaller device.

Example 18

Exemplary Whack

Figure 3A:
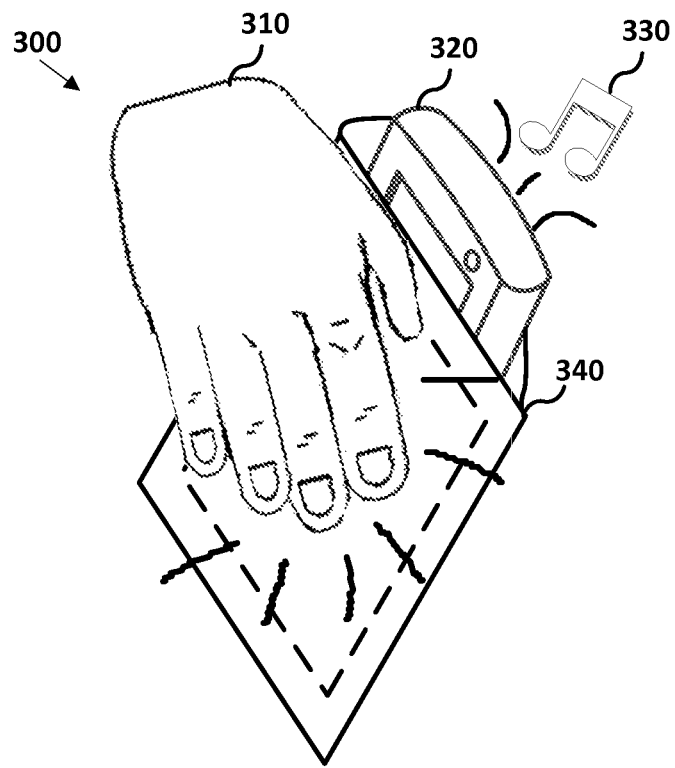
FIG. 3A is a diagram of an exemplary whack on which exemplar whack event data can be based.

FIG. 3A is a diagram 300 of an exemplary whack on which exemplar whack event data can be based. In the diagram 300, a user 310 whacks a mobile device 320 that is producing an audio signal 330. For example, the whack applies force to the mobile device 320 which causes the mobile device 320 to move over a period of time and accelerate accordingly. A whack can be a hitting of the mobile device 320 such as with a slap, hit, swat, smack, flick, push, tap, or the like. The whack can include impact with the device 320. Because the user 310 has the mobile device 320 in a pocket 340, the whack is generally applied to one side of the mobile device 320. A whack can be applied to one side of a mobile device or more than one side of a mobile device. When the mobile device 320 is whacked, the whack can be detected with reference to exemplar whack event data.

Example 19

Exemplary Accelerometer Axes

Figure 3B:
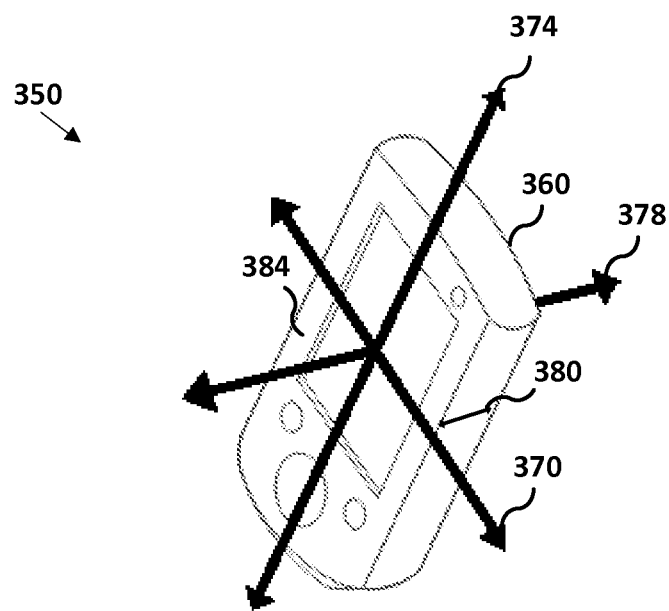
FIG. 3B is a diagram illustrating exemplary accelerometer axes for a mobile device.

FIG. 3B is a diagram 350 illustrating exemplary accelerometer axes for a mobile device. As seen in FIG. 3B a mobile device 360 can have an exemplary coordinate system for which acceleration can be measured that includes an X axis 370, a Y axis 374, and a Z axis 378. The Z axis 378 corresponds to the short dimension 380 of the mobile device 360. If the force of a whack is applied generally to the front side 384 of mobile device 360, the mobile device 360 can move and accelerate generally along the Z axis 378. If the mobile device 360 encounters another object while moving, it can bounce off of the object and move along the Z axis 378 in the opposite direction.

A mobile device can rest on one side or multiple sides when whacked by a user. For example, the mobile device can be in a pocket of a user or lying on a table. Because of the orientation of the mobile device, the force of the whack can generally be applied to one side of the mobile device causing the mobile device to move and rebound off of another object. Over a period of time, a whack can cause a mobile device to move and accelerate generally in a direction and the rebound can cause the mobile device to move and accelerate generally in another direction (e.g., generally the opposite direction).

Because the force of a whack is generally applied to one side of the mobile device it can be useful to measure the acceleration of the device along a single axis of a coordinate system for the mobile device (e.g., isolate the data of one axis). In one example, detection of acceleration along a short axis of the device (e.g., the axis orthogonal (e.g., generally) to the display or touchscreen of the mobile device) can be sufficient to determine whether a whack has occurred.

Measuring the acceleration along a single axis of the coordinate system such as along the Z axis 378 can be beneficial for preventing false detections of a whacking event. The motion from a whack can be primarily along one axis of the coordinate system for the device, and limiting consideration of acceleration along that single axis can be sufficient to detect a user whack. By not using acceleration information from other axes when determining whether a whack event has occurred, resources of the mobile device 360 can be conserved. For example, not using acceleration information for the X axis 370 and Y axis 374 while determining a correlation of data can improve the detection of a whacking event if there is less motion along those axes than in the Z axis 378.

Still, measurement of the acceleration of a moving mobile device can be taken according to various axes of a coordinate system for a mobile device, and acceleration information from various axes can be used to determine a correlation with exemplar event data.

Example 20

Exemplary Method of Employing a Combination of the Technologies

Figure 4:
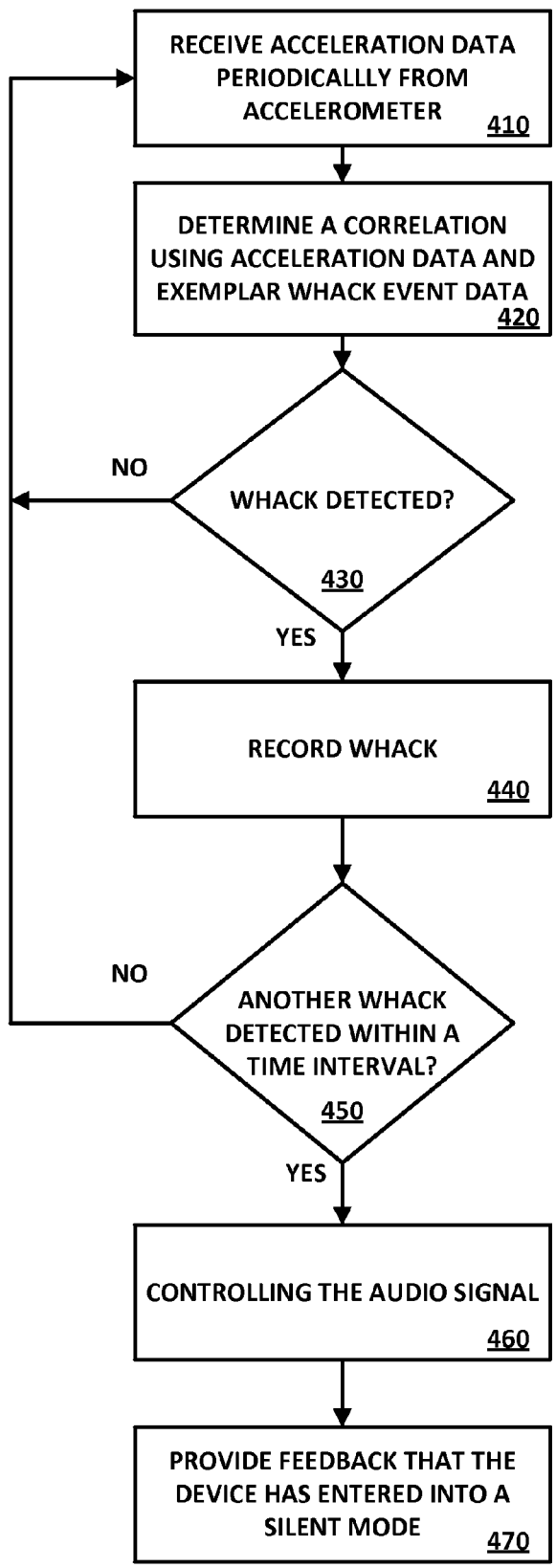
FIG. 4 is a flowchart of an exemplary method of implementing detection of a plurality of whacks.

FIG. 4 is a flowchart of an exemplary method 400 of controlling an audio signal of a mobile device (e.g., directly or indirectly).

At 410, acceleration data is received from the accelerometer.

At 420, a correlation is determined using acceleration data and exemplary whacking event data. The correlation can be based on the measurements of acceleration of the mobile device and exemplar whack event data stored by the mobile device.

At 430 a determination is made if a whack has been detected. It can be determined that a whack has been detected if the correlation is sufficient to indicate a whacking event has occurred.

At 440, a detected whack is recorded. For example, an indicator that a whack has been detected can be stored in a memory store.

At 450, a determination is made if another whack has been detected within a time interval.

At 460, the audio signal of the mobile device is controlled. For example, the audio signal can be controlled based on the determination that more than one whack is detected within a time interval.

At 470, feedback is provided that the device has entered into a silent mode.

Example 21

Exemplary System with Data Window of Accelerometer Data

Figure 5:
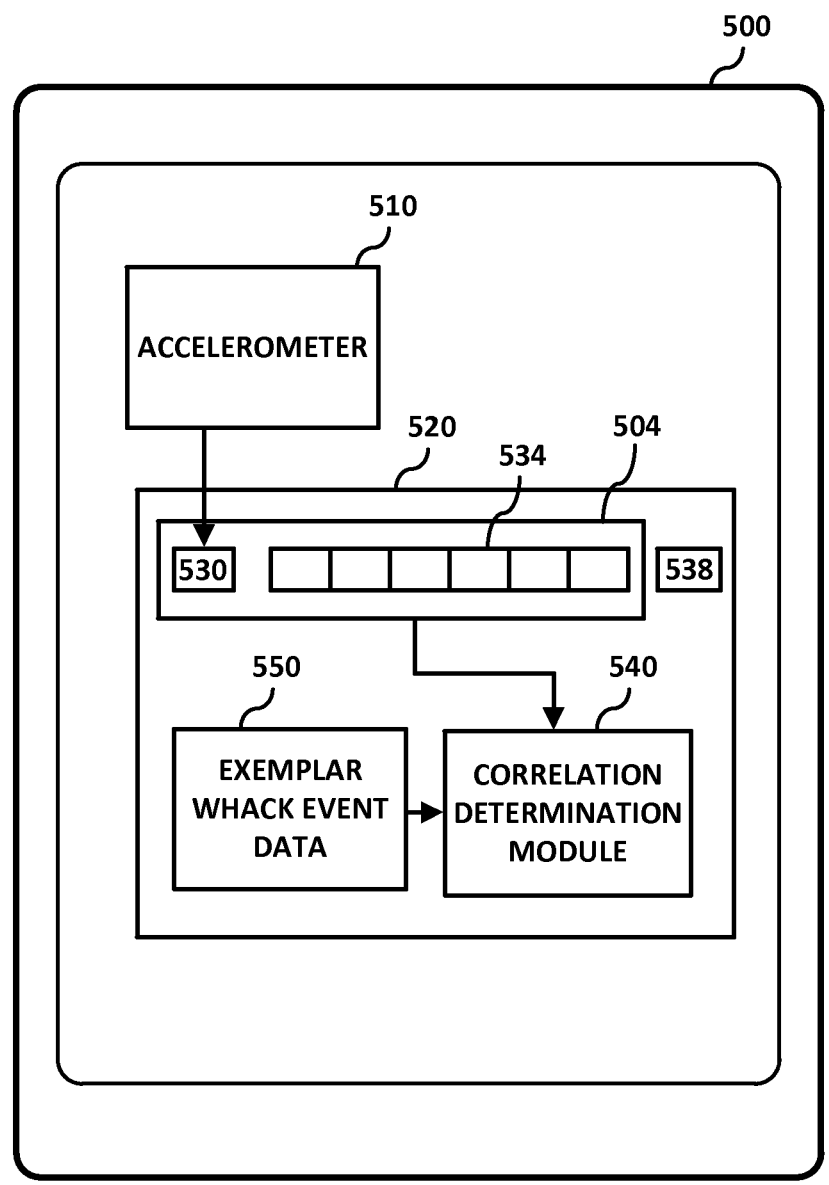
FIG. 5 is a block diagram of an exemplary system implementing event detection via a sliding window of accelerometer data.

In any of the examples herein, a data window of accelerometer data can be used. FIG. 5 is a block diagram of an exemplary system implementing event detection via a sliding window of accelerometer data. In FIG. 5, an exemplary mobile device 500 uses an acceleration data window 504 in the controlling of a mobile device audio signal. In the example, an accelerometer 510 measures acceleration of the mobile device 500 and provides a whack based audio control module 520 acceleration data samples 534 sampled at a predetermined rate (e.g., 50 samples per second).

The most recently received acceleration data sample 530 is added (e.g., while the device is producing audio) to a set of previously received samples 534 to create the acceleration data window 504 which can be portion of the received acceleration data samples. For example, the set of previously received samples 534 can be a predetermined number of the most recently received samples, or some other set of received samples. For example, as the acceleration window 504 slides to include the most recently received acceleration data sample 530, acceleration data sample 538 is removed from the acceleration window 504, because it was received before samples 534 and its inclusion would exceed the predetermined number of samples allowed in the set of previously received samples 534 of the acceleration data window 504. After the acceleration window slides to include the most recently received acceleration data sample 530, the acceleration data window 504 is processed by a correlation determination module 540.

The exemplar whack event data 550 is also available to the correlation determination module 540. The correlation determination module 540 uses the acceleration data window 504 and the exemplar whack event data 550 to determine a correlation between the sets of data. Based on the correlation determined by the correlation determination module 540, the audio signal of mobile device 500 is controlled.

The connections shown in FIG. 5 do not necessarily indicate direct connections and can be more complex including intermediate connections. In practice, the mobile device 500 can be less or more complicated (e.g., with additional functionality than that shown).

Example 22

Exemplary Method with Data Window of Accelerometer Data

Figure 6:
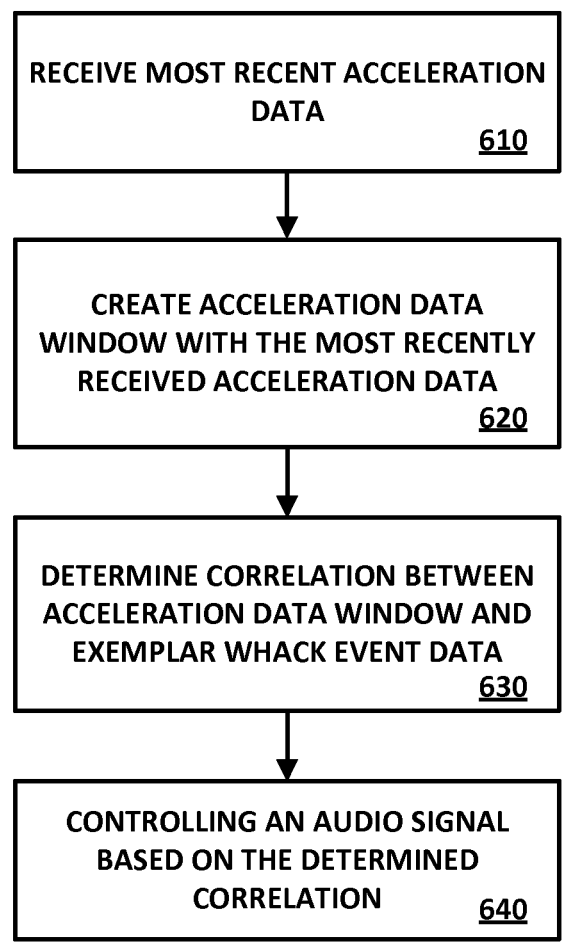
FIG. 6 is a flowchart of an exemplary method detecting events via a sliding window of accelerometer data.

FIG. 6 is a flowchart of an exemplary method 600 of using sampled acceleration data to control an audio signal of a mobile device.

At 610 a most current sample of acceleration data is received. Acceleration data can be sampled from an accelerometer. For example, an accelerometer can measure and output current acceleration data at a predetermined rate (e.g., 50 samples per second).

At 620 an acceleration data window is created. Although a size of 20 is discussed for purposes of example, the technology can be used with other sizes. An acceleration data window can be the most current sampled acceleration data combined with previously received samples of acceleration data. For example, when the most current sample is received, the sample can be added to the 20 most recently received samples to create the acceleration data window. In another example the most current sample can be combined with a predetermined set of previously received samples. In another example, an acceleration data window can slide as periodic acceleration measurements are received. For example, the acceleration data window can have a set number of measurements allowed in the window and as new acceleration data measurements are received, the acceleration data window can slide to include the most recently received acceleration data measurements within the set number of allowed measurements. The sliding of the acceleration window can exclude or remove previously included measurement samples of the window. Also, the sliding of a window can create a new window. For example, a first window can slide to include new samples and exclude old samples to make a new window or second window.

At 630 a correlation between the acceleration data window and exemplar whack event data is determined by evaluating (e.g., comparing) the data. For example, the most current sampled acceleration data combined with 20 previously received samples can be used as input into a statistical function along with exemplar whack event data to determine a correlation between the sets of data.

At 640 an audio signal of the device is controlled based on the determined correlation. For example, a message alert is controlled based on a correlation sufficient to indicate that a whack is detected.

Example 23

Exemplary Advantages

Although not necessary, various advantages can accrue from using the technologies described herein. For example, when a mobile device is stationary, it still has acceleration applied to it due to the effects of gravity. Although the acceleration data could be pre-filtered in an attempt to remove the constant effects of gravity, use of a correlation coefficient as described herein can provide accurate correlation determination without regard to the constant effects of gravity.

Example 24

Exemplary Computing Environment

Figure 7:
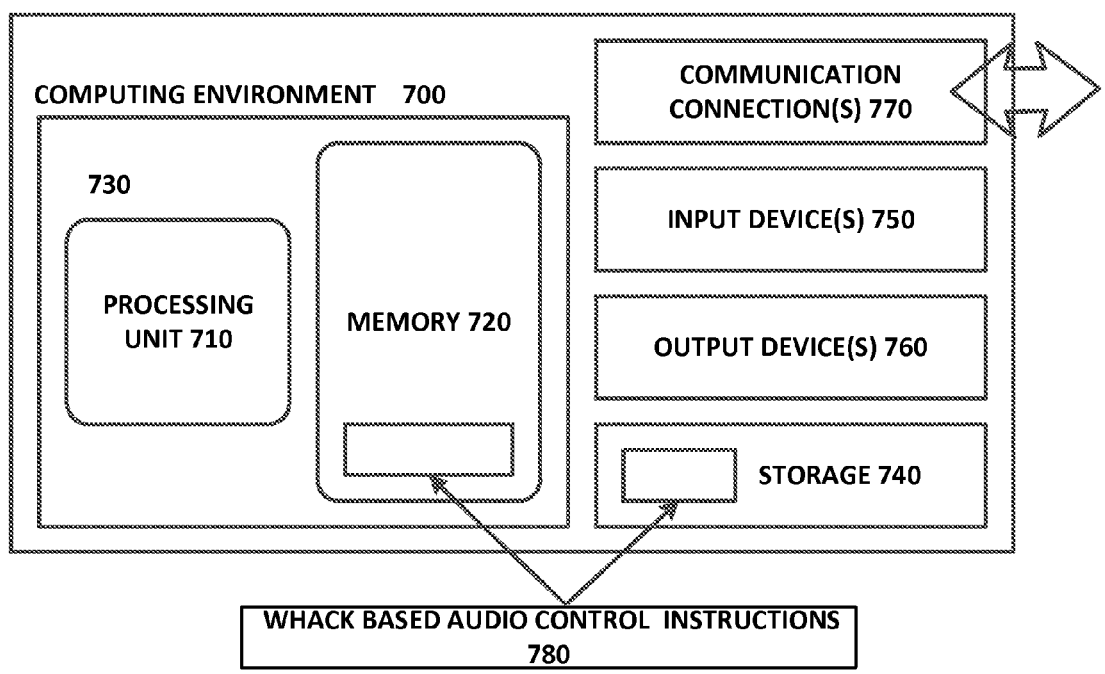
FIG. 7 is a diagram illustrating an exemplary computing environment in which described embodiments may be implemented.

FIG. 7 illustrates a generalized example of a suitable computing environment 700 in which described embodiments, techniques, and technologies may be implemented. The computing environment 700 is not intended to suggest any limitation as to scope of use or functionality of the technology, as the technology may be implemented in diverse general-purpose or special-purpose computing environments. For example, the disclosed technology may be implemented with any type of computing device, including hand held devices, mobile communications devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 7, the computing environment 700 includes at least one processing unit 710 and memory 720. In FIG. 7, this most basic configuration 730 is included within a dashed line. The processing unit 710 executes computer-executable instructions. In a multi-processing system, multiple processing units execute computer-executable instructions to increase processing power and as such, multiple processors can be running simultaneously. The memory 720 may be volatile memory (e.g., registers, cache, RAM), non-volatile memory (e.g., ROM, EEPROM, flash memory, etc.), or some combination of the two. The memory 720 stores software 780 that can, for example, implement the whack based audio control technologies described herein. A computing environment may have additional features. For example, the computing environment 700 includes storage 740, one or more input devices 750, one or more output devices 760, and one or more communication connections 770. An interconnection mechanism (not shown) such as a bus, a controller, or a network, interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other medium which can be used to store information and which can be accessed within the computing environment 700. The storage 740 stores instructions for the software 780, which can implement technologies described herein.

The input device(s) 750 may be a touch input device, such as a keyboard, keypad, mouse, pen, or trackball, a voice input device, a scanning device, or another device, that provides input to the computing environment 700. The environment may also have a touch screen as an input device and display. For audio, the input device(s) 750 may be a sound card or similar device that accepts audio input in analog or digital form, or a CD-ROM reader that provides audio samples to the computing environment 700. The output device(s) 760 may be a display, printer, speaker, CD-writer, or another device that provides output from the computing environment 700.

The communication connection(s) 770 enable communication over a communication medium (e.g., a connecting network) to another computing entity. The communication medium conveys information such as computer-executable instructions, or other data in a modulated data signal.

Computer-readable media are any available media that can be accessed within a computing environment 700. By way of example, and not limitation, with the computing environment 700, computer-readable media include memory 720 and/or storage 740. As should be readily understood, the term computer-readable storage media includes the media for data storage such as memory 720 and storage 740, and not transmission media such as modulated data signals.

Example 25

Exemplary Mobile Device

Figure 8:
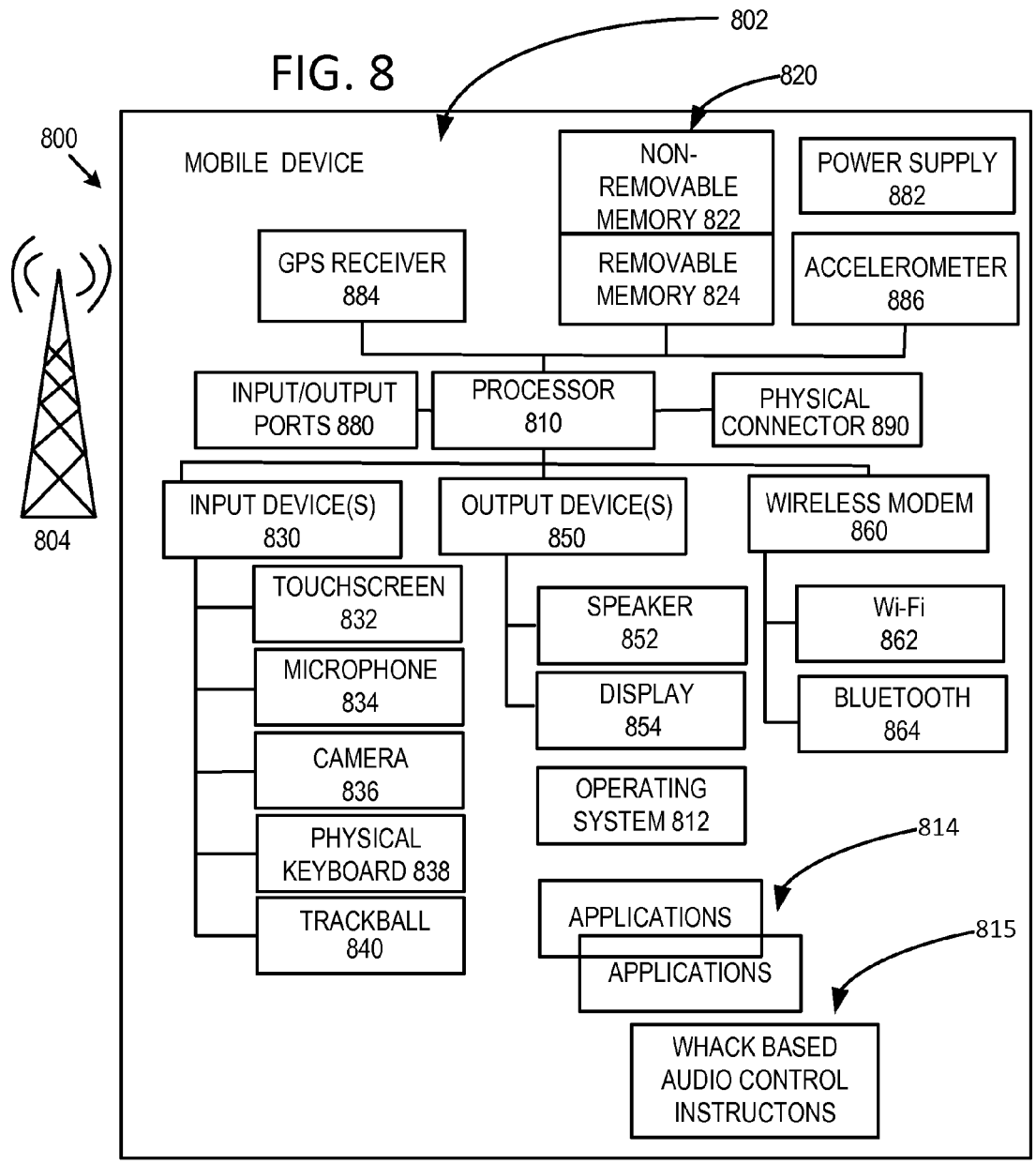
FIG. 8 is a diagram illustrating an exemplary mobile device in which described embodiments may be implemented.

FIG. 8 is a system diagram depicting an exemplary mobile device 800 including a variety of optional hardware and software components, shown generally at 802. Any components 802 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 804, such as a cellular or satellite network.

The illustrated mobile device 800 can include a controller or processor 810 (e.g., signal processor, microprocessor, ASIC, or other control and processing logic circuitry) for performing such tasks as signal coding, data processing, input/output processing, power control, and/or other functions. An operating system 812 can control the allocation and usage of the components 802 and support for one or more application programs 814, 815. The application programs can include common mobile computing applications (e.g., email applications, calendars, contact managers, web browsers, messaging applications), any whack based audio control technologies described herein, or any other computing application.

The illustrated mobile device 800 can include memory 820. Memory 820 can include non-removable memory 822 and/or removable memory 824. The non-removable memory 822 can include RAM, ROM, flash memory, a hard disk, or other well-known memory storage technologies. The removable memory 824 can include flash memory or a Subscriber Identity Module (SIM) card, which is well known in GSM communication systems, or other well-known memory storage technologies, such as "smart cards." The memory 820 can be used for storing data and/or code for running the operating system 812 and the application programs 814. Example data can include web pages, text, images, sound files, video data, or other data sets to be sent to and/or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 800 can support one or more input devices 830, such as a touch screen 832, microphone 834, camera 836, physical keyboard 838 and/or trackball 840 and one or more output devices 850, such as a speaker 852 and a display 854. Other possible output devices (not shown) can include piezoelectric or other haptic output devices. Some devices can serve more than one input/output function. For example, touchscreen 832 and display 854 can be combined in a single input/output device.

A wireless modem 860 can be coupled to an antenna (not shown) and can support two-way communications between the processor 810 and external devices, as is well understood in the art. The modem 860 is shown generically and can include a cellular modem for communicating with the mobile communication network 804 and/or other radio-based modems (e.g., Bluetooth or Wi-Fi). The wireless modem 860 is typically configured for communication with one or more cellular networks, such as a GSM network for data and voice communications within a single cellular network, between cellular networks, or between the mobile device and a public switched telephone network (PSTN).

The mobile device can further include at least one input/output port 880, a power supply 882, a satellite navigation system receiver 884, such as a Global Positioning System (GPS) receiver, an accelerometer 886, gyroscope, and/or a physical connector 890, which can be a USB port, IEEE 1394 (FireWire) port, and/or RS-232 port. The illustrated components 802 are not required or all-inclusive, as any components can deleted and other components can be added.

Example 26

Exemplary Implementation Environment

Figure 9:
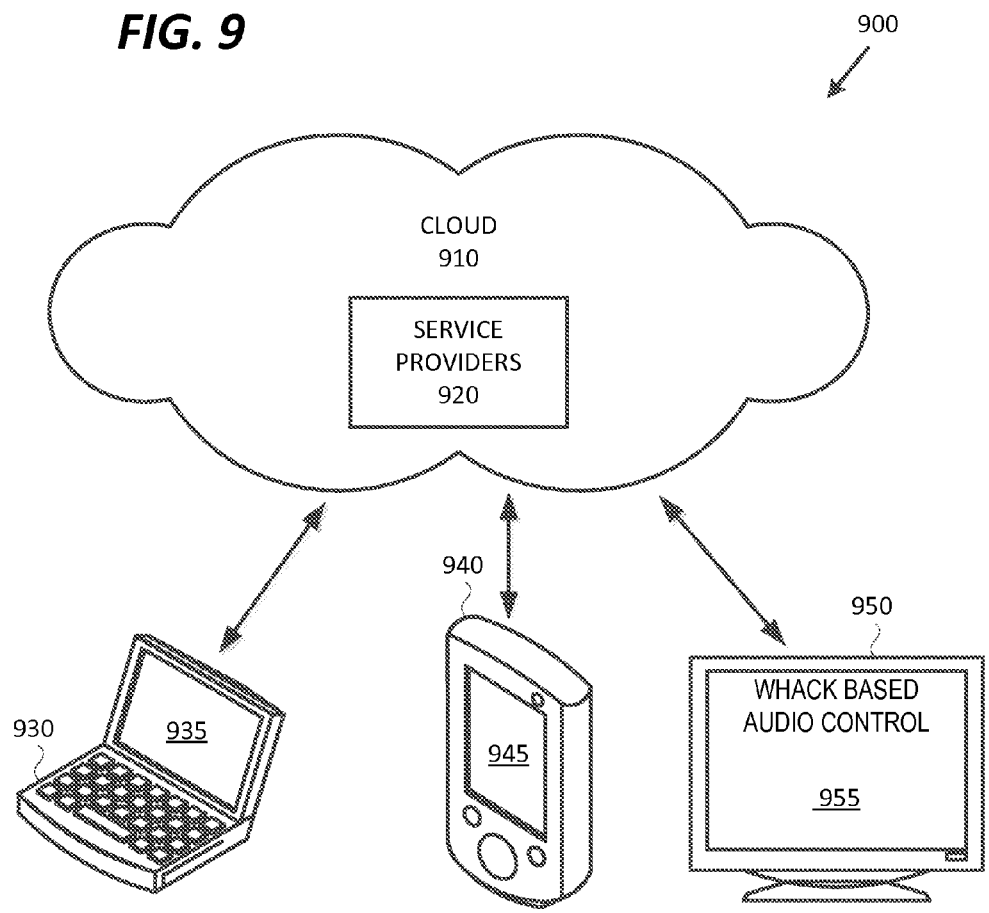
FIG. 9 is a diagram illustrating a generalized example of a suitable implementation environment in which described embodiments may be implemented.

FIG. 9 illustrates a generalized example of a suitable implementation environment 900 in which described embodiments, techniques, and technologies may be implemented.

In example environment 900, various types of services (e.g., computing services) are provided by a cloud 910. For example, the cloud 910 can comprise a collection of computing devices, which may be located centrally or distributed, that provide cloud-based services to various types of users and devices connected via a network such as the Internet. The implementation environment 900 can be used in different ways to accomplish computing tasks. For example, some tasks (e.g., processing user input and presenting a user interface) can be performed on local computing devices (e.g., connected devices 930, 940, 950) while other tasks (e.g., storage of data to be used in subsequent processing) can be performed in the cloud 910.

In example environment 900, the cloud 910 provides services for connected devices 930, 940 950 with a variety of screen capabilities. Connected device 930 represents a device with a computer screen 935 (e.g., a mid-size screen). For example, connected device 930 can be a personal computer such as desktop computer, laptop, notebook, netbook, or the like that implements the whack based audio control technologies described herein. Connected device 940 represents a device with a mobile device screen 945 (e.g., a small size screen). For example, connected device 940 can be a mobile phone, smart phone, personal digital assistant, tablet computer, and the like. Connected device 950 represents a device with a large screen 955. For example, connected device 950 can be a television screen (e.g., a smart television) or another device connected to a television (e.g., a set-top box or gaming console) or the like. One or more of the connected devices 930, 940, 950 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 900. For example, the cloud 910 can provide services for one or more computers (e.g., server computers) without displays.

Services can be provided by the cloud 910 through service providers 920, or through other providers of online services (not depicted). For example, cloud services can be customized to the screen size, display capability, and/or touch screen capability of a particular connected device (e.g., connected devices 930, 940, 950).

In example environment 900, the cloud 910 provides the technologies and solutions described herein to the various connected devices 930, 940, 950 using, at least in part, the service providers 920. For example, the service providers 920 can provide a centralized solution for various cloud-based services. The service providers 920 can manage service subscriptions for users and/or devices (e.g., for the connected devices 930, 940, 950 and/or their respective users).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method comprising:
in a mobile communications device:
before beginning to produce an audio signal, receiving information indicative of acceleration of the mobile communications device;
after beginning to produce the audio signal, receiving information indicative of acceleration of the mobile communications device;
with the received information indicative of acceleration after beginning to produce the audio signal, generating an acceleration data window, the acceleration data window comprising a number of acceleration data samples;
with the acceleration data window, determining correlation between the information indicative of acceleration of the mobile communications device after beginning to produce the audio signal and exemplar whack event data, wherein the correlation after beginning to produce the audio signal is adjusted based on the received information indicative of acceleration before beginning to produce the audio signal; and
based at least on the correlation, controlling the audio signal of the mobile communications device.

2. The method of claim 1 wherein:
determining the correlation comprises evaluating the acceleration data window comprising the number of acceleration data samples against the exemplar whack event data.

3. The method of claim 2 further comprising:
adding a sample and removing a sample from the acceleration data window comprising the number of acceleration data samples as the mobile communications device produces the audio signal.

4. The method of claim 1 comprising:
recording incidence of a prior whack event; and
upon detecting correlation between the information indicative of acceleration of the mobile communications device and the exemplar whack event data, determining whether the prior whack event occurred within a threshold period of time;
wherein, controlling the audio signal is performed responsive to determining that the prior whack event occurred within the threshold period of time.

5. The method of claim 1 further comprising:
receiving additional information indicative of acceleration of the mobile communications device;
determining correlation between the additional information indicative of acceleration of the mobile communications device and the exemplar whack event data;
wherein controlling the audio signal of the mobile communications device is further based at least on detecting a plurality of whacking events within a threshold time interval.

6. The method of claim 1, wherein determining correlation comprises determining a correlation coefficient.

7. The method of claim 1, wherein the audio signal comprises at least one of an incoming call ringtone, an alarm, or user-initiated audio.

8. The method of claim 1, wherein:
information indicative of acceleration considered during determining correlation is limited to information indicative of acceleration of a single axis;
wherein the mobile communications device produces information indicative of acceleration for a plurality of axes.

9. The method of claim 8, wherein:
the single axis is a short axis of the mobile communications device.

10. The method of claim 8, wherein:
the single axis is orthogonal to a touchscreen of the mobile communications device.

11. The method of claim 8, comprising:
disregarding information indicative of acceleration for at least one axis of the plurality of axes.

12. The method of claim 1 further comprising:
providing feedback that the mobile communications device has changed into a silent mode.

13. The method of claim 1, wherein controlling the audio signal comprises silencing the audio signal of the mobile communications device.

14. The method of claim 1, wherein determining correlation comprises selecting exemplar whack event data indicative of acceleration circumstances of the mobile communications device before beginning to produce the audio signal.

15. The method of claim 1, wherein determining correlation comprises setting a threshold value higher or lower than a default threshold value based on the information indicative of acceleration received before beginning to produce the audio signal.

16. The method of claim 1, wherein determining correlation comprises filtering out noise data from the acceleration data via the information indicative of acceleration received before beginning to produce the audio signal.

17. A mobile device comprising:
at least one accelerometer;
at least one speaker;
at least one processor; and
memory, the memory storing instructions that when executed by the at least one processor causes the mobile device to perform a method, the method comprising:
collecting acceleration data samples from the at least one accelerometer before beginning to produce an audio signal by the mobile device;
collecting acceleration data samples from the at least one accelerometer after beginning to produce the audio signal on the mobile device;
with the collected acceleration data samples, generating an acceleration data window, the acceleration data window comprising a number of the collected acceleration data samples;
with the acceleration data window, determining a correlation coefficient using at least a portion of the collected acceleration data samples and exemplar whack event data; and
controlling the audio signal based at least on a correlation based on the correlation coefficient, wherein the correlation is adjusted based on the acceleration data samples collected before beginning to produce the audio signal.

18. The mobile device of claim 17 wherein the method further comprises:
determining a second correlation coefficient at least using a second portion of the collected acceleration data samples and the exemplar whack event data;
determining that the correlation coefficient and second correlation coefficient were determined within a time interval; and
wherein controlling the audio signal is further based at least on the second correlation coefficient and the determination that the correlation coefficient and second correlation coefficient were determined within the time interval.

19. The mobile device of claim 17, wherein:
the acceleration data samples comprise acceleration data along a single axis; and
wherein the exemplar whack event data corresponds to acceleration along the single axis.

20. A computer-readable memory storing computer-executable instructions, the computer-executable instructions causing a computing device to perform a method, the method comprising:
before beginning to signal an audio signal, initiating collection of accelerometer data from an accelerometer of the computing device, the accelerometer data comprising a plurality of acceleration data samples, the plurality of acceleration data samples comprising magnitudes of acceleration periodically measured;
when the computing device begins signaling the audio signal, initiating collection of accelerometer data from an accelerometer of the computing device, the accelerometer data comprising a plurality of acceleration data samples, the plurality of acceleration data samples comprising magnitudes of acceleration periodically measured along a single, short axis of the computing device orthogonal to a touchscreen of the computing device;
generating a first acceleration data window of the accelerometer data, wherein the generating the first acceleration data window comprises sliding a previous acceleration data window to add a new acceleration data sample to a set of the plurality of acceleration data samples and removing an old acceleration data sample from the set of the plurality of acceleration data samples, the first acceleration data window comprising a predetermined number of the plurality of acceleration data samples;
detecting a first whack event based on a first correlation, wherein the first correlation is adjusted based on the accelerometer data collected before beginning to signal the audio signal, wherein the first correlation is determined using at least the predetermined number of the plurality of acceleration data samples from the first acceleration data window of the accelerometer data and exemplar whack event data as input into a statistical function, and the set of the plurality of acceleration data samples of the first acceleration data window of the accelerometer data is limited to that of the single, short axis of the computing device orthogonal to the touchscreen of the computing device;
detecting a second whack event based on a second correlation, wherein the second correlation is adjusted based the accelerometer data collected before beginning to signal the audio signal, wherein the second correlation is determined using at least a second acceleration data window of the accelerometer data and the exemplar whack event data;
determining that the first whack event and the second whack event were detected within a threshold time interval; and
based on the determination that the first and second whack events were detected within a time interval, silencing the audio signal of the computing device.

* * * * *